(12) United States Patent
Smith et al.

(10) Patent No.: US 9,848,583 B2
(45) Date of Patent: Dec. 26, 2017

(54) RETRACTABLE LEASH

(71) Applicants: Ellis Junior Smith, Belmont, NC (US); Jacob Ellis Smith, Belmont, NC (US)

(72) Inventors: Ellis Junior Smith, Belmont, NC (US); Jacob Ellis Smith, Belmont, NC (US)

( * ) Notice: Subject to any disclaimer, the term of this patent is extended or adjusted under 35 U.S.C. 154(b) by 115 days.

(21) Appl. No.: 14/790,067

(22) Filed: Jul. 2, 2015

(65) Prior Publication Data
US 2017/0000088 A1    Jan. 5, 2017

(51) Int. Cl.
*A01K 27/00*    (2006.01)

(52) U.S. Cl.
CPC .................................. *A01K 27/004* (2013.01)

(58) Field of Classification Search
CPC .. A01K 27/004; B65H 75/40; B65H 75/4418; B65H 75/4431; B65H 75/4434
USPC ........... 119/712, 794, 796; 242/378.1, 378.2, 242/378.3, 385.1, 385.3, 396, 396.1, 242/396.2, 396.3, 396.4
See application file for complete search history.

(56) References Cited

U.S. PATENT DOCUMENTS

| | | | | |
|---|---|---|---|---|
| 2,250,171 A | * | 7/1941 | Wilkins | ............... A01K 27/004 242/377 |
| 2,314,504 A | | 3/1943 | Lifchultz | |
| 2,494,003 A | * | 1/1950 | Russ | .................. B65H 54/2812 242/397.3 |
| 2,866,436 A | * | 12/1958 | Swain | .................. A01K 27/004 119/797 |
| D235,026 S | | 4/1975 | Bogdahn | |
| 6,523,500 B1 | * | 2/2003 | Zenteno | .................... A01K 1/04 119/786 |
| 6,938,667 B2 | * | 9/2005 | Sugiyama | ................. E06B 9/54 160/296 |
| 7,325,515 B2 | * | 2/2008 | Hetland | ............... A01K 27/003 119/795 |
| 8,347,824 B2 | * | 1/2013 | Marshall | ............... A01K 27/005 119/794 |
| 2006/0272595 A1 | * | 12/2006 | Edwards | ............... A01K 27/008 119/795 |
| 2008/0230015 A1 | | 9/2008 | Bleshoy | |
| 2009/0114759 A1 | | 5/2009 | Bogdahn | |
| 2011/0030812 A1 | * | 2/2011 | McKimmy | ............ B65H 75/40 137/355.26 |
| 2011/0073047 A1 | * | 3/2011 | Simpson | ................... A01K 1/04 119/796 |

* cited by examiner

Primary Examiner — Lisa L Tsang
(74) Attorney, Agent, or Firm — Jeffrey Sonnabend; SonnabendLaw

(57) ABSTRACT

A retractable leash having an internal spooling mechanism, active damping/braking mechanism and sensor activated ultrasonic whistle. The spooling mechanism is contained in a handle and oscillates linearly up and down when the leash member is unwound. A finger separator is contained in the handle, the finger separator having an internal channel with openings to permit the leash member to be unwound therethrough.

20 Claims, 18 Drawing Sheets

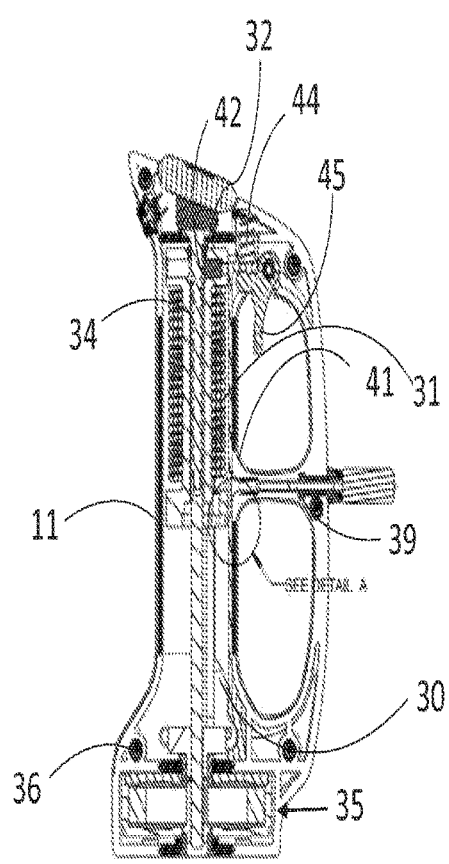
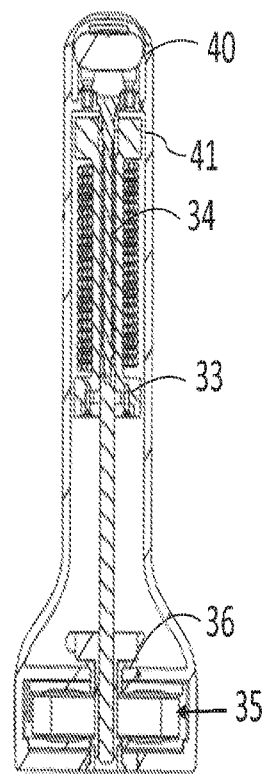
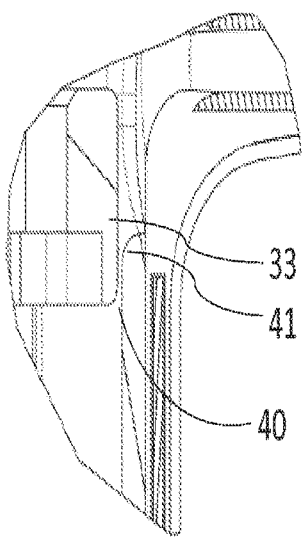
FIG 6
FIG 7
FIG 6A

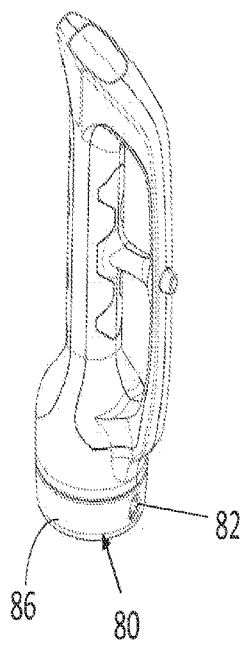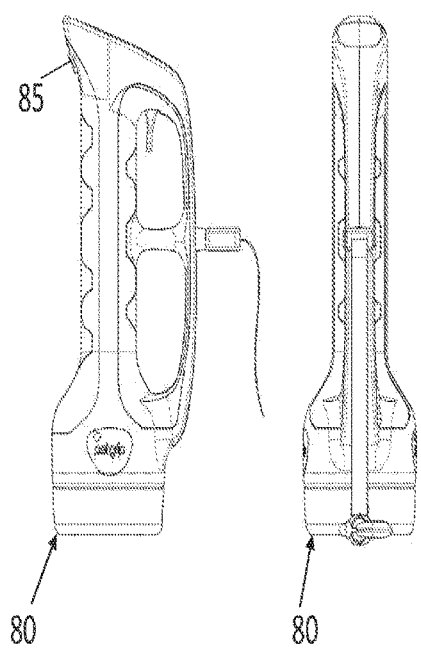
FIG 12A
FIG 12B  FIG 12c

RETRACTABLE LEASH

CROSS REFERENCE TO RELATED APPLICATIONS

This application claims priority of U.S. Provisional Patent Application Ser. Nos. 67/020,436, 67/020,438 and 67/020,439, each filed on Jul. 3, 2014 and each incorporated herein by reference. This application also claims priority of U.S. Provisional Patent Application Ser. No. 67/174,676, filed on Jun. 12, 2015 and incorporated herein by reference.

BACKGROUND OF THE INVENTION

Field of the Invention

The instant invention concerns generally animal leashes. The instant invention more specifically concerns retractable animal leashes and specific improvements thereto.

Description of the Related Art

Retractable pet leashes (also referred to herein as retractable "dog leashes") are well known in the prior art. In operation, retractable pet leashes allow for the effective length of the leash to vary; that is, the leash may be lengthened and shortened as desired by the person operating it.

Retractable pet leashes generally comprise a leash member, on one end of which is an attachment means for attaching the leash member to a pet's collar. The leash member is secured on the opposite end to a spool contained in a housing, the housing further forming in part a handle portion so that the entire device can be held by a person walking the pet. The spool allows for the leash member to be spooled out (i.e., unwound) to increase the effective leash length and to be spooled in (i.e., wound) to shorten the effective leash length. One example of such prior art device is disclosed in U.S. Pat. No. 2,314,504.

Prior art retractable pet leashes include various braking/locking mechanisms; that is, various mechanisms which operate to slow, dampen or stop the spooling of the leash member, in the one or both of the winding and unwinding directions. Two example of such a prior art device are disclosed in U.S. Pat. Pubs. Nos. 2008/0230015 A1 and 2009/0114759 A1.

Prior art retractable leashes suffer significant shortcomings. One primary shortcoming results from device configurations whereby the handle portion of the device is positioned behind the spool mechanism, as shown in the above cited prior art references, as well as, by way of further example, in U.S. Design Pat. No. D235,026. In such configuration, the center of gravity is positioned forward of the user's hand. The force of gravity on the device creates a downward moment about the user's hand and wrist (i.e., it applies a rotational force about that point). This can lead to fatigue, discomfort and stress injuries.

Additionally, in the above-mentioned configuration, the center of gravity of the device is positioned below the line of the user's forearm causing the wrist to typically be held at an angle to the forearm. As a result, forces applied colinearly along the leash member create an upward moment about the user's hand and wrist, tending to "snap" or "jerk" the users hand and wrist upwardly. Such forces are generated for example when a dog pulls, runs, lunges or otherwise rapidly increases the tension on the leash member or suddenly reaches the full extension of the leash member, thereby creating a shock load as the unwinding suddenly ceases. The sudden applied stress on the hand and wrist can easily lead to injury.

Prior art devices generally lack sufficient means of retracting the leash member without pulling the attached dog or walking toward a stationary attached dog. As a result, many users use their free hand to pull the leash member to force it to wind onto the spool. This leads to injuries in the nature of rope burns and cuts when a dog pulls, runs or lunges while the leash member is in the user's free hand.

Among other shortcomings of the prior art are: current retractable leashes tend to break very easily mainly due to the lightweight design of the lock systems and the shock loads produced by the dogs; current retractable leashes have no means of tracking the distance pets have run, (and so a dog owner has no way of knowing if her dog was walked sufficiently in her absence by, for example, a hired dog walker); it can be very difficult to lock a leash quick enough when a dog lunges forward; certain prior art retractable leashes have an on/off lock that locks the leash member at a certain, predetermined distance, however, in such devices the leash member may go slack if the dog gets close to the user; and current retractable leashes are designed for minimal resistance, which gives dogs maximum freedom but does not properly train aggressive dogs that would benefit from a higher resistance.

It is therefore desirable to have a retractable pet leash that solves these various shortcomings of the prior art. Specifically, it is desirable to have a retractable leash that reduces the undesirable transmission of forces to the user such as shock load and other forces detailed above, for example, by providing damped unwinding of the leash member.

It is further desirable to have an improved damping/locking mechanism, including a mechanism that allows for one multiple lock control positions or modes, including: unlock; momentary lock; and detented lock.

It is also desirable to have a retractable pet leash that minimizes or eliminates the problems of the prior art arising from the prior art's placement of the user's hand behind the spool mechanism, i.e., the above-described problems concerning the various rotational forces created about a user's hand and wrist. The desired design would include: a center of gravity located closer to the user's wrist, thereby applying less stress on the wrist; force in alignment with a user's forearm; a stronger grip position; an ergonomic and/or "soft feel" grip. The foregoing improvements, in addition to minimizing the fatigue and possible injury related to the rotational forces of the prior art, would render the retractable leash more appropriate for use by exercising users such as runners.

SUMMARY OF THE INVENTION

Embodiments of the present invention include, among others, a retractable leash with a housing having an interior and forming a handle, the handle having a top and bottom, a spool located in the interior of the housing, the spool located on a shaft, the shaft also located in the interior of the housing, a finger separator positioned away from the handle top and handle bottom and extending outwardly from the handle, the finger separator having an aperture at its distal end and an internal channel, the internal channel providing communication between the aperture and the interior of the housing, and a leash member affixed to the spool and extending through the internal channel of the finger separator and through the aperture of the finger separator.

The foregoing embodiments may include a spool bushing on the spool, an interior load bearing surface in the housing interior opposite the spool bushing, and a gap between the spool busing and the interior load bearing surface when the leash member is not under load. In these embodiments, the shaft may deform when the leash member is under load and the spool bushing may then come in contact with the interior load bearing surface.

The shaft of certain embodiments of the present invention may include a fixed shaft portion and a rotating shaft portion. In these embodiments, upon rotation of the rotating shaft portion in a first direction the leash member is wound onto the spool and upon rotation of the rotating shaft portion in a second direction the leash member is unwound off of the spool. Furthermore, in these embodiments, upon rotation of the rotating shaft portion the spool may translate axially along the shaft and rotate with the shaft.

In these embodiments, when operated by a user with the leash member extended at least in part, the leash member may lie substantially co-axially with a user's forearm and the finger separator may lie between the user's fingers.

Embodiments of the present invention may include a torsion spring coupled to the rotating shaft portion, biased to turn the rotating shaft in the first (i.e., winding) direction. The embodiments may include a lock coupled to the rotating shaft portion, the lock having a locked position in which rotation of the rotating shaft portion in the second direction is prevented. They may also include a one way bearing coupled to the rotating shaft portion and the lock, the one way bearing permitting rotation of the rotating shaft portion in the first direction when the lock is in the locked position.

Still other embodiments of the present invention may include a damping mechanism, the damping mechanism comprising a ferromagnetic rotor coupled to the rotating shaft portion, and a residual magnet operatively coupled the ferromagnetic rotor. In these embodiments, when the residual magnet is magnetized, the ferromagnetic rotor dampens the rotation of the rotating shaft portion in the second direction. Furthermore, these embodiments may include control circuitry operatively coupled to the residual magnet for controlling the magnetization of the residual motor. The control circuitry may include at least one sensor input selected from the group of sensor inputs comprising leash speed inputs, leash acceleration inputs, device accelerometer inputs, device drop detector inputs, shaft turn inputs, and user control (e.g., manually operated) inputs, and the control circuitry may control the magnetization of the residual motor based on one or more of these sensor inputs.

Similarly, the control circuitry may control an ultrasonic transducer to produce ultrasonic sounds, for example, for training purposes. The ultrasonic transducer may be controlled by the control circuitry based on one or more of the aforementioned inputs and may produce a variety of pitches, sounds and sound patterns.

In all embodiments, the present invention may be configured so that when it is operated by a user with the leash member extended at least in part, the leash member lies substantially co-axially with a user's forearm. The finger separator may also lie between the user's fingers in such situations, and the leash member may lie substantially co-axially with the user's forearm. The handle of such embodiments may be substantially cylindrical.

It will be understood that the coupling of elements described herein may be direct or indirect coupling (i.e., coupling through intermediary components) as to achieve the desired functionality. For example, it will be understood that "operatively coupled" as used in connection with a residual magnet and ferromagnetic rotor means positioned such that the magnetic force of the magnet affects the rotation of the rotor and as such need not but may be in physical contact with the rotor.

The foregoing Summary of the Invention is not intended to limit the scope of the disclosure contained herein nor limit the scope of the appended claims. To the contrary, as will be appreciated by those persons skilled in the art, variations of the foregoing described embodiments may be implemented without departing from the claimed invention.

BRIEF DESCRIPTION OF THE DRAWINGS

The objects and features of the invention may be understood with reference to the following detailed description of an illustrative embodiment of the present invention taken together in conjunction with the accompanying drawings in which:

FIG. 6 is a side elevation cross section of a preferred embodiment of the present invention, and FIG. 6A is a detail of a section of FIG. 6.

FIG. 7 is a front elevation cross section of a preferred embodiment of the present invention.

FIG. 12A is a perspective view of components of a preferred embodiment of the present invention.

FIGS. 12B-12C are a side and front elevation views, respectively, of a preferred embodiment of the present invention.

FIGS. 17-17A are detail views of certain components of a preferred embodiment of the present invention.

DESCRIPTION OF THE PREFERRED EMBODIMENT

Referring to the figures, preferred embodiments of the present invention will now be discussed.

Figure 1D:
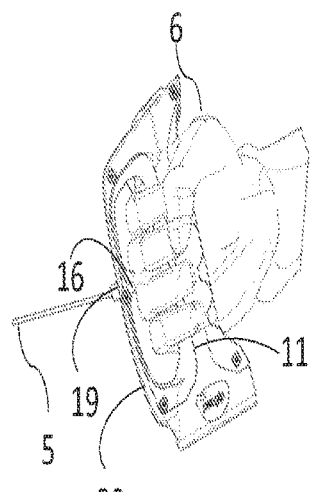
FIGS. 1A-1D are perspective views of a preferred embodiment of the present invention shown in use.
Figure 1B:
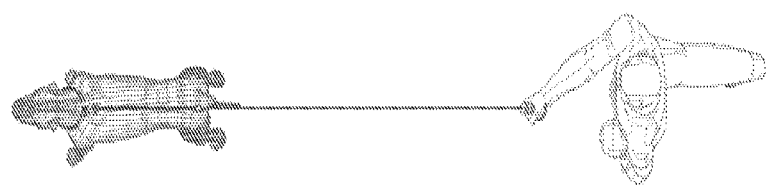
Figure 1C:
Figure 1A:
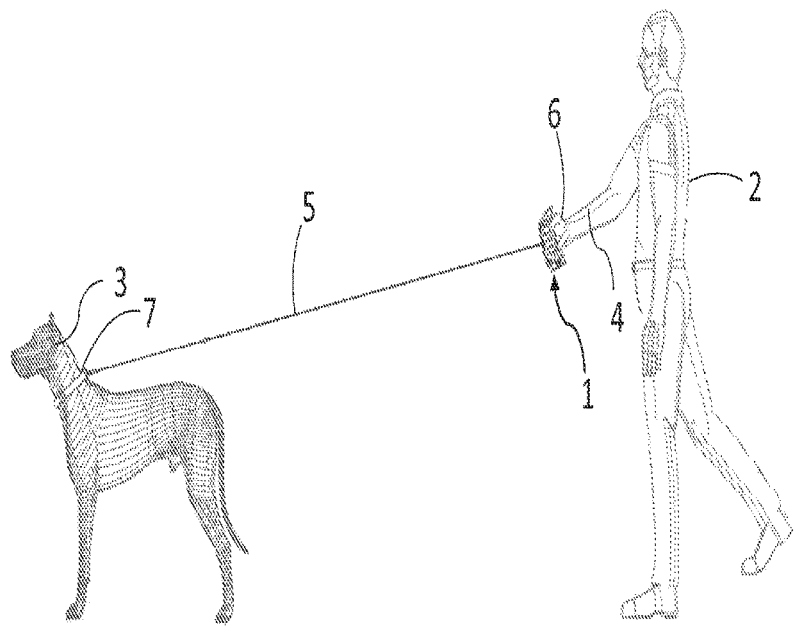
Figure 4:
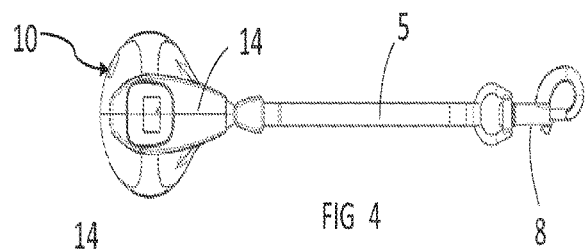
FIG. 4 is a top elevation view of a preferred embodiment of the present invention.
Figure 2:
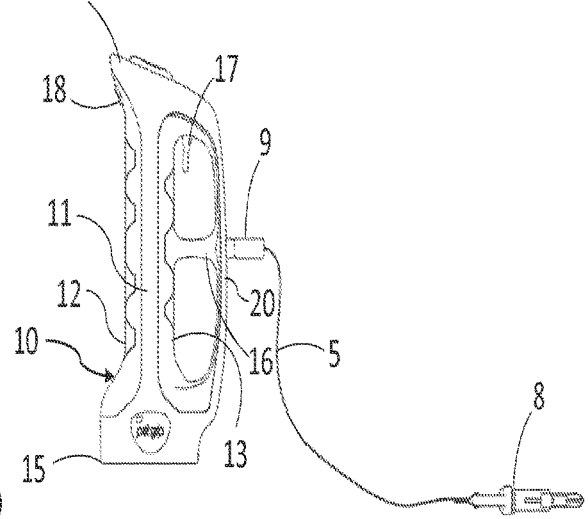
FIG. 2 is a side elevation view of a preferred embodiment of the present invention.
Figure 3:
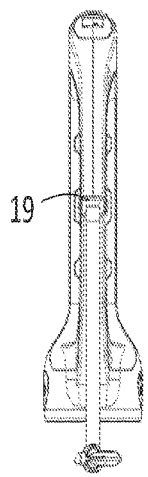
FIG. 3 is a front elevation view of a preferred embodiment of the present invention.
Figure 5:
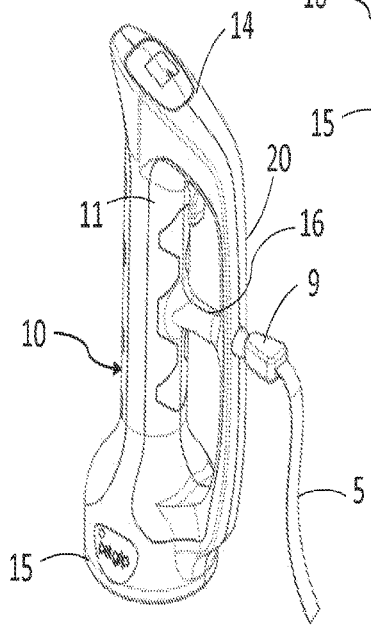
FIG. 5 is a perspective view of a preferred embodiment of the present invention.

FIGS. 1A-1C show a preferred embodiment of the present invention in use. Retractable leash 1 is held by user 2 in the user's hand 6. A dog, 3, is attached at the distal end 7 of the leash member 5. Leash member 5 is generally aligned colinearly with user's forearm 4. It will be appreciated that while FIGS. 1B and 1C show the users forearm 4 positioned so that the user's hand 6 is positioned approximately medially, as the dog 3 exerts increased pull on the leash member 5, the users forearm 4 will tend to be pulled so that it is positioned more laterally, thus increasing the colineality of the leash member with the forearm.

FIG. 1D shows a closeup of a preferred embodiment of the present invention in a user's hand 6. The user is holding handle 11. Finger guard 20 is positioned in front of the user's fingers. A portion of leash member 5 is shown extending out of aperture 19. Finger separator 16 is shown positioned between the user's second and third fingers, and leash member 5 is contained therein (not shown in FIG. 1D). Finger separator 16 may alternatively be positioned in use between a user's first and second or third and fourth fingers. It will be understood that finger separator 16 may be integrally formed with the housing 10 and/or handle 11, or alternatively may be a discreet component affixed to one or both of housing 10 and handle 11.

Referring now to FIGS. 2 through 5, housing 10 may be constructed from left and right sections that may be joined as readily understood by those of skill in the art. Housing 10 may be made of any suitably stiff and light material such as plastic, including preferably an acetal resin plastic such as DuPont Delrin brand acetal resin plastic. Handle 11 includes a rear portion 12 and front portion 13. Housing 10 includes a top 14 and a base 15. Whistle/electric brake activator button 18 may be used to activate the ultrasonic transducer (i.e., the whistle) and/or to activate damping as will be described in detail further below. As used herein, "brake" and "braking" are synonymous with "damp" and "damping".

Leash member 5 includes a clasp member 8 at its distal end and a lunette 9 at its proximal end. The clasp member may be of a generally known design for securing a pet to the leash member. The lunette 9, may also be of a generally known design for stopping the winding of the leash member upon the lunette's contact with the housing. In operation, leash member 5 is fed through aperture 19, through finger separator 16 and into the interior of handle 11, where it is spooled, as will be described further. Leash member 5 may comprise two parts, one which may be wound onto spool 34 (not shown in FIGS. 2 through 5) and one which is not wound onto spool 34. The portion of leash member 5 which may be wound onto spool 34 may be of a different shape than that portion of leash member 5 which is not wound onto spool 34. For example, the former portion may have a cylindrical cross-section to facilitate winding while the latter may be flat to facilitate handling by the user. Alternatively, the entire length of leash member 5 may be of one or the other aforementioned shape, or may be of entirely different shape.

Lock switch 17 may be used to operate the lock mechanism, as will be described further. Leash member 5 may be formed preferably as a ribbon, i.e. with a flat configuration.

Referring now to FIGS. 6 and 7, certain operational aspects of the instant preferred embodiment will be described.

Rotating shaft 30 and fixed worm shaft 31 are joined longitudinally via, for example, a male/female connection so as to form a continuous shaft through at least a portion of interior of handle 11. Rotating shaft 30 and fixed worm shaft 31 are joined such that rotating shaft 30 is free to rotate about its longitudinal axis while fixed worm shaft 31 is not free to rotate about its longitudinal axis (i.e., fixed worm shaft 31 is fixed to prevent rotation). Rotating shaft 30 may be coupled to torsion spring assembly 35 such that when torsion spring assembly rotates by operation of the spring force, rotating shaft 30 also rotates. Fixed worm shaft 31 comprises a self-reversing worm gear, also known as a self-reversing screw and/or a spooling screw or gear, commonly used in spooling applications such as fishing reels and the like and described, for example, in U.S. Pat. No. 2,494,003.

Spool 34 is positioned onto shafts 30 and 31 inside handle 11 such that a portion of the spool length is at all times in operable communication with internal opening 38 of leash channel 39, i.e., such that leash member 5 may wind and unwind onto and off of spool 34 while being free to extend and retract through channel 39. Spool 34 has two bushings 33, one upper and one lower.

Rotating shaft 30 may be any shape which permits it to be rotationally coupled to spool 34 without being translationally coupled to spool 34 in the longitudinal (axial) direction. In this manner, when rotating shaft 30 rotates, spool 34 also rotates, while spool 34 remains free to move longitudinally up and down rotating shaft 30. Rotating shaft 30 is preferably of a hexagonal cross section, and spool 34 preferably has a matching opening for receiving rotating shaft 30 and fixed worm shaft 31 such that spool 34 may rotate with rotating shaft 30, rotate about fixed worm shaft 31, and translate up and down on the combined shafts 30 and 31.

In operation, leash member 5 is wound onto and unwound off of spool 34 and through leash channel 39, as follows. When rotating shaft 30 rotates, for example, when driven by the rotation of torsion spring assembly 35, spool 34 also rotates. Spool 34 is coupled to fixed worm shaft 31 by means of worm shaft pin (also called a "pawl") 32 located in upper spool bushing 33. Worm shaft pin 32 travels in the grooves of fixed worm shaft 31, forcing spool 34 to travel up and down fixed worm shaft 31, as will be readily understood by those familiar with the operation of spooling devices such as fishing reels and the like and described, for example, in U.S. Pat. No. 2,494,003. As spool 34 rotates and translates longitudinally, it winds leash member 5 onto (or, in the opposite direction of rotation, unwinds off of) spool 34.

Referring now to FIG. 6A, gap 40, located between upper spool bushing 33 and load bearing surface 41 is seen. In operation, when rotating shaft 30 is locked (i.e., not free to rotate, as described more fully below) and a pet pulls on leash member 5, combined shafts 30 and 31 flex slightly towards load bearing surface 41, placing upper spool bushing 33 into contact with load bearing surface 41. In this manner, the tension load of the pulling animal is born by load bearing surface 41, not combined shafts 30 and 31, thereby providing sufficient strength and reaction force to the pulling force while limiting, reducing or eliminating the stress applied to combined shafts 30 and 31.

Figure 8:
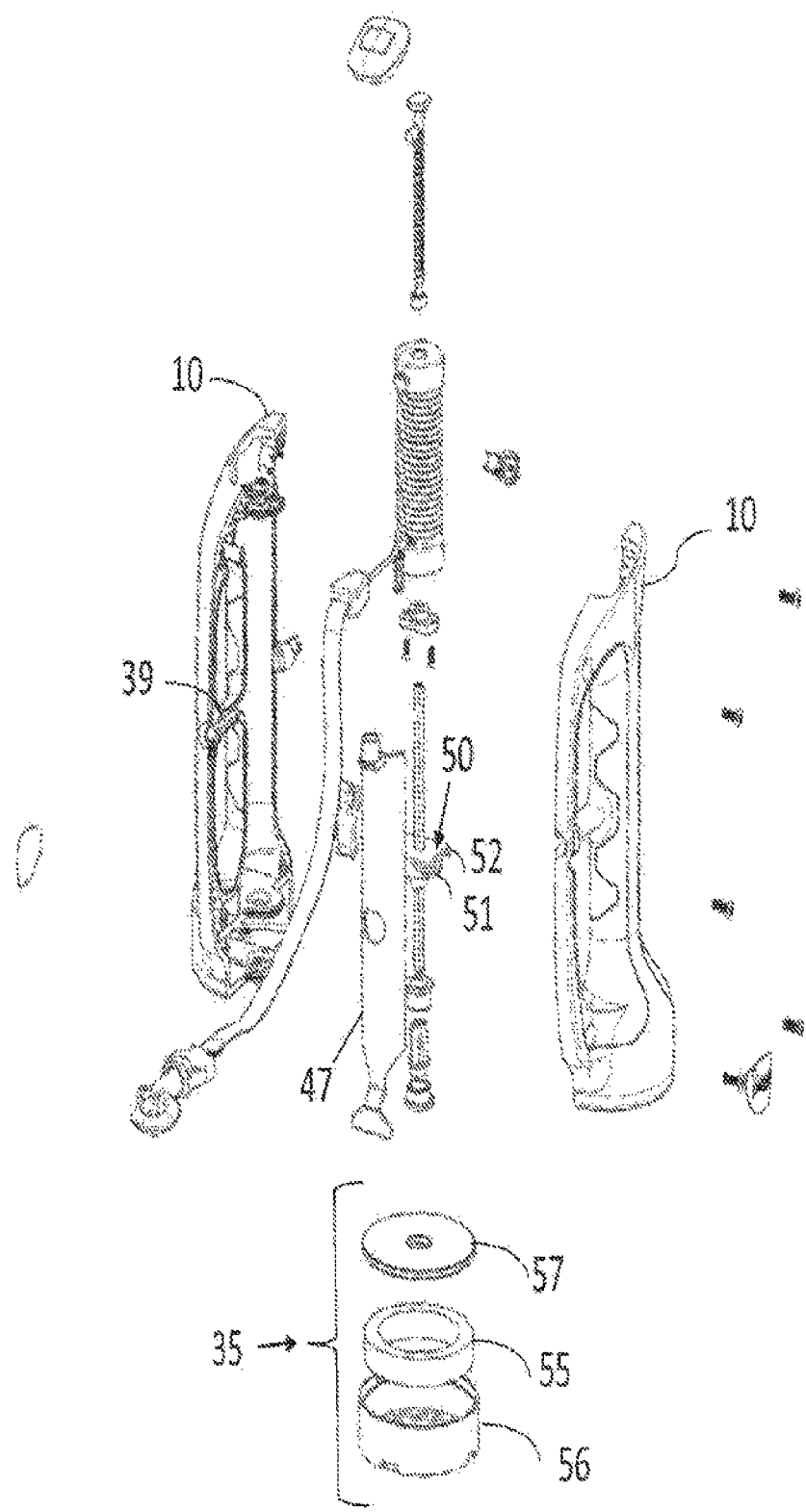
FIG. 8 is an exploded view of a preferred embodiment of the present invention.

FIG. 8 shows an exploded view of the preferred embodiment already described. In this figure, housing 10 is shown exploded into its left and right sections that may be joined to form a unitary housing. Among other details shown in FIG. 8 is the left half of leash channel 39, which forms the completed leash channel in conjunction with the equivalent structure formed in the right section of housing 10 when the two sections of housing 10 are joined.

Also shown in FIG. 8 is lock slider 47 and lock gear 50, the operation of which will be described in detail in connection with FIGS. 9 and 10A-10D. Torsion spring assembly 35, comprising torsion spring 55, torsion spring housing 56 and torsion spring housing cap 57, is also shown in exploded view.

Figure 9:
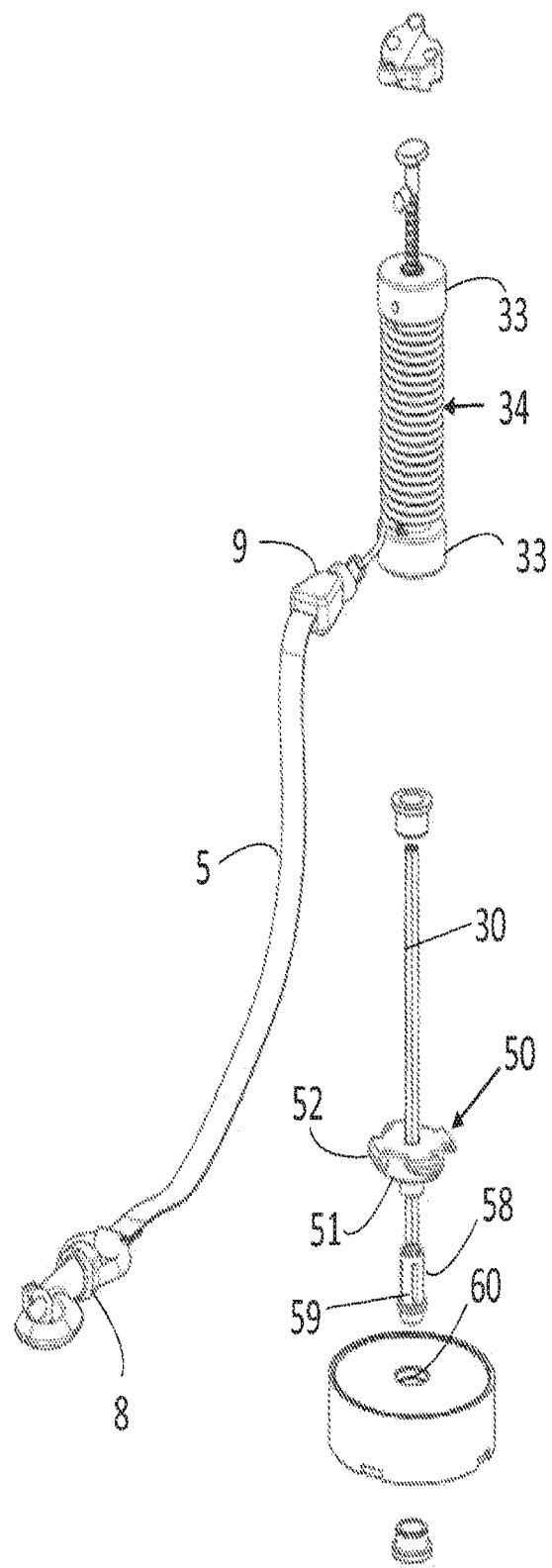
FIG. 9 is an exploded view of certain components of a preferred embodiment of the present invention.

FIG. 9 shows an exploded view of the spooling subsystem of the preferred embodiment already described. Lock gear 50, having alternating lock gear detents 51 and teeth 52, is shown fixedly attached to rotating shaft 30. Lock gear 50 includes an aperture through which rotating shaft 30 extends in such a manner that lock gear 50 is not free to rotate about rotating shaft 30 but instead rotates with it in similar manner to the rotation of the rotational coupling of spool 34, described above, except that lock gear 50 is also translationally coupled to rotating shaft 30 in the longitudinal (axial) direction. In this manner, when rotating shaft 30 rotates, lock gear 50 also rotates but is not free to move longitudinally up and down rotating shaft 30. Likewise, when lock gear 50 is restrained from rotation, as will be described, rotating shaft 30 is thereby restrained from rotation too.

Rotating shaft 30 is coupled to torsion spring 55 via shaft adapter 58. Shaft adapter 58 is coupled to rotating shaft 30 in substantially the same manner as lock gear 50, that is, shaft adapter 58 is not free to rotate about rotating shaft 30 but instead rotates with it in similar manner to the rotation of the rotational coupling of spool 34, except that shaft adapter 58 is also translationally coupled to rotating shaft 30 in the longitudinal (axial) direction and so is not free to move longitudinally up and down rotating shaft 30. Shaft adapter 58 includes shaft adapter slots 59. In operation, shaft adapter 58 is located inside torsion spring housing 56 via opening 60, at which time ends of torsion spring 55 are placed into shaft adapter slots 59. In this manner, when torsion spring 55 rotates, so to does shaft adapter 58, and consequently, so to does rotating shaft 30.

FIGS. 10A-10D disclose details of the lock mechanism of the preferred embodiment already described. Lock gear 50 is situation on rotating shaft 30, as previously described. Lock slider 47 is attached to or inside body 10 (not shown) such that it is free to translate (i.e., slide) up and down. Lock biasing spring 44, retained in lock slider spring retainer 49, ordinarily biases lock slider 47 downward, maintaining lock slider 47 in its unlocked state (i.e., where it does not engage lock gear 50). Lock slider 47 may be moved upward into its locked state (i.e., where it does engage lock gear 50) by activation of lock switch 17, which pivots to force lock slider 47 upward.

Figure 10A:
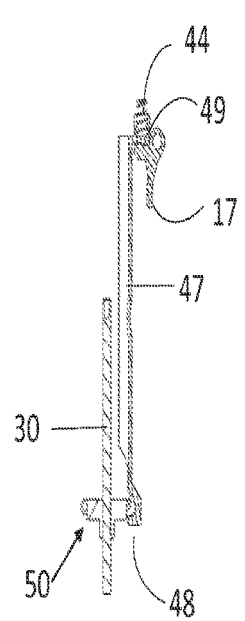
FIGS. 10A-10B are side elevation views of the lock components of a preferred embodiment of the present invention.
Figure 10B:
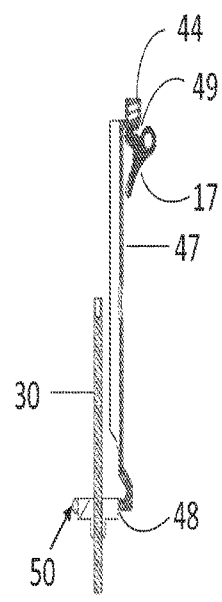
Figure 10C:
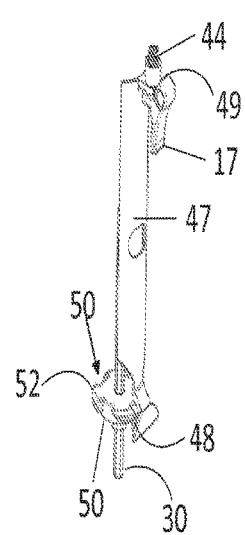
FIG. 10C is a perspective view of the lock components of a preferred embodiment of the present invention.
Figure 10D:
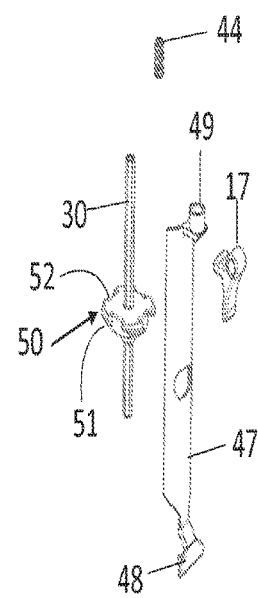
FIG. 10D is an exploded view of the lock components of a preferred embodiment of the present invention.

As shown in FIG. 10A, in its unlocked position, lock slider projection 48 remains below the lock gear teeth 52. In this state, lock slider projection 48 does not affect the ability of lock gear 50 to rotate, for instance, when rotating shaft 30, to which it is coupled, rotates. As shown in FIG. 10B, upon lock slider 47 being moved into its locked state, lock slider projection 48 moves upward so as to be in the same plane as lock teeth 52, at which point lock slider projection 48 will be occupy one of the lock gear detents 51, located between two of lock teeth 52. In this position, lock slider projection 48 will prevent the rotation of lock gear 50, and consequently rotating shaft 30, by coming into contact with one or more of the lock teeth 52. As will be understood by those of skill in the art, the undersides of lock teeth 52 may be shaped, e.g., inclined, to permit lock slider projection 48 to slide into one of the lock gear detents while lock gear 50 is rotating.

Figure 11:
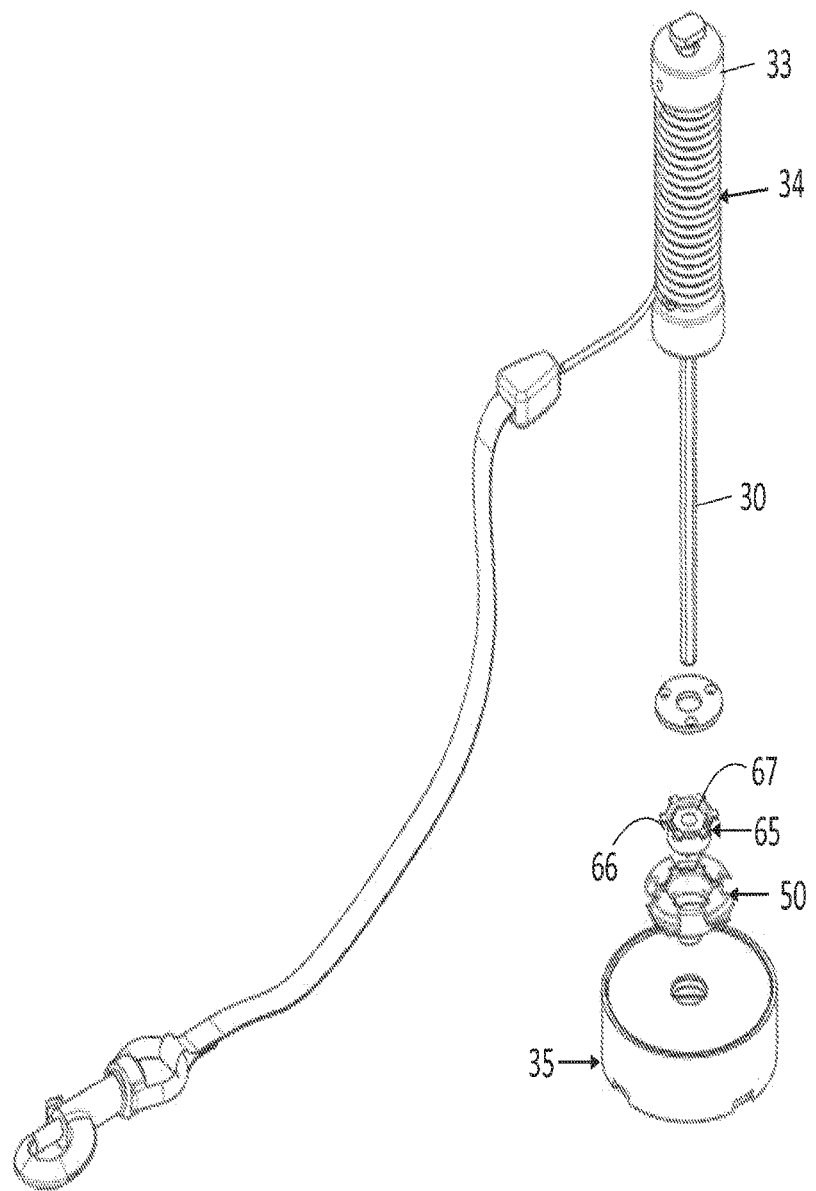
FIG. 11 is an exploded view of certain components of a preferred embodiment of the present invention.
Figure 13:
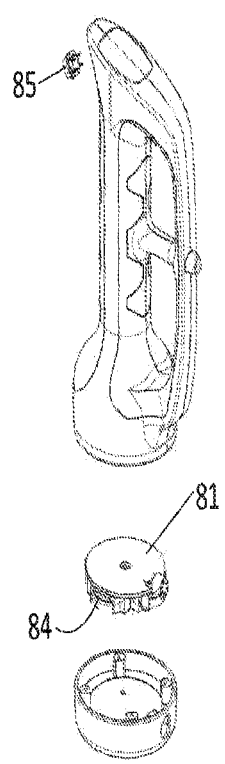
FIG. 13 is a partially exploded view of a preferred embodiment of the present invention.
Figures 14, 14A:
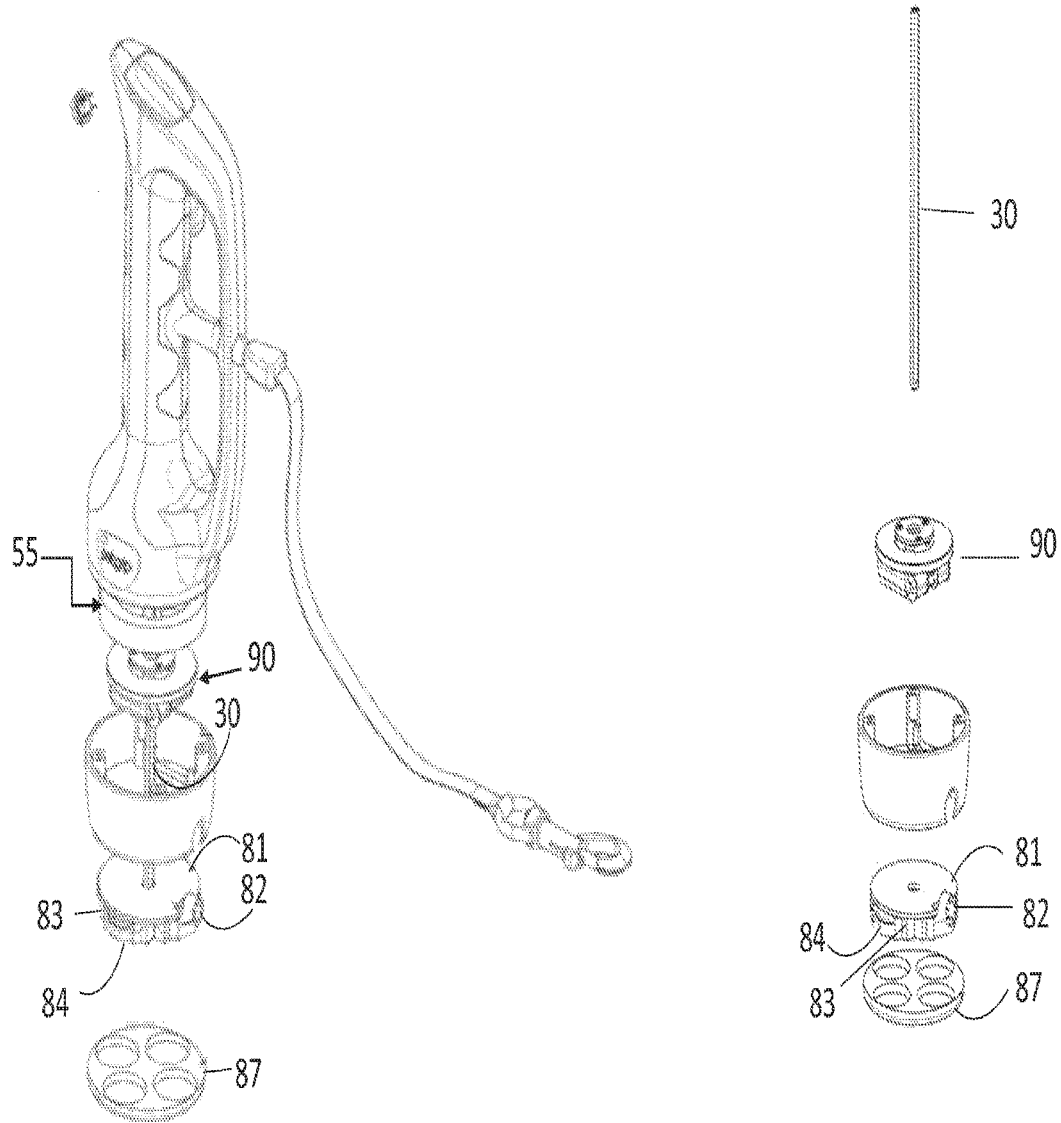
FIGS. 14-14A are exploded views of certain components of a preferred embodiment of the present invention.
Figure 15:
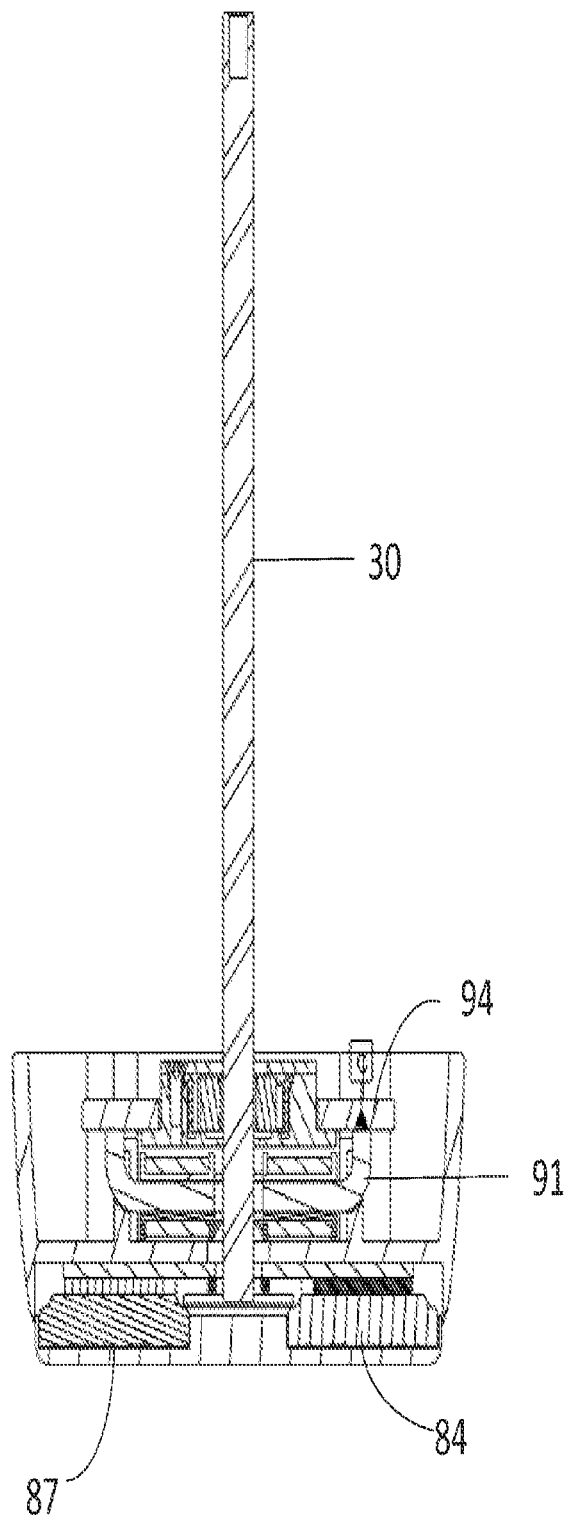
FIG. 15 is a cutaway view of certain components of a preferred embodiment of the present invention.
Figure 16:
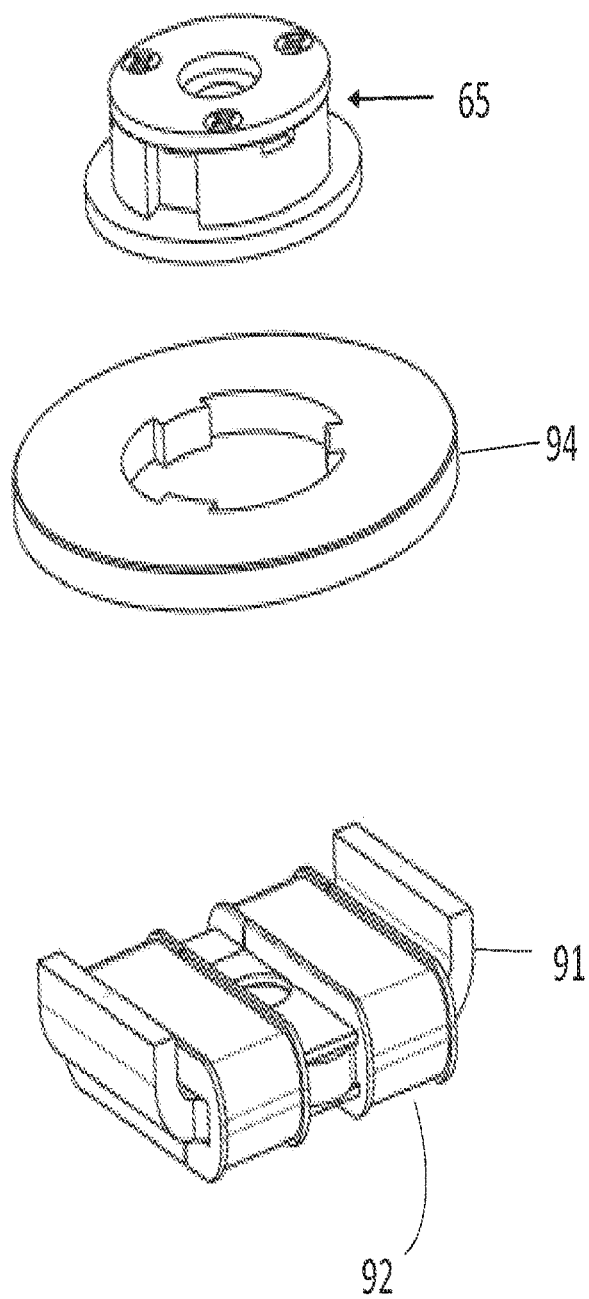
FIG. 16 is an exploded view of certain components of a preferred embodiment of the present invention.
Figure 17:
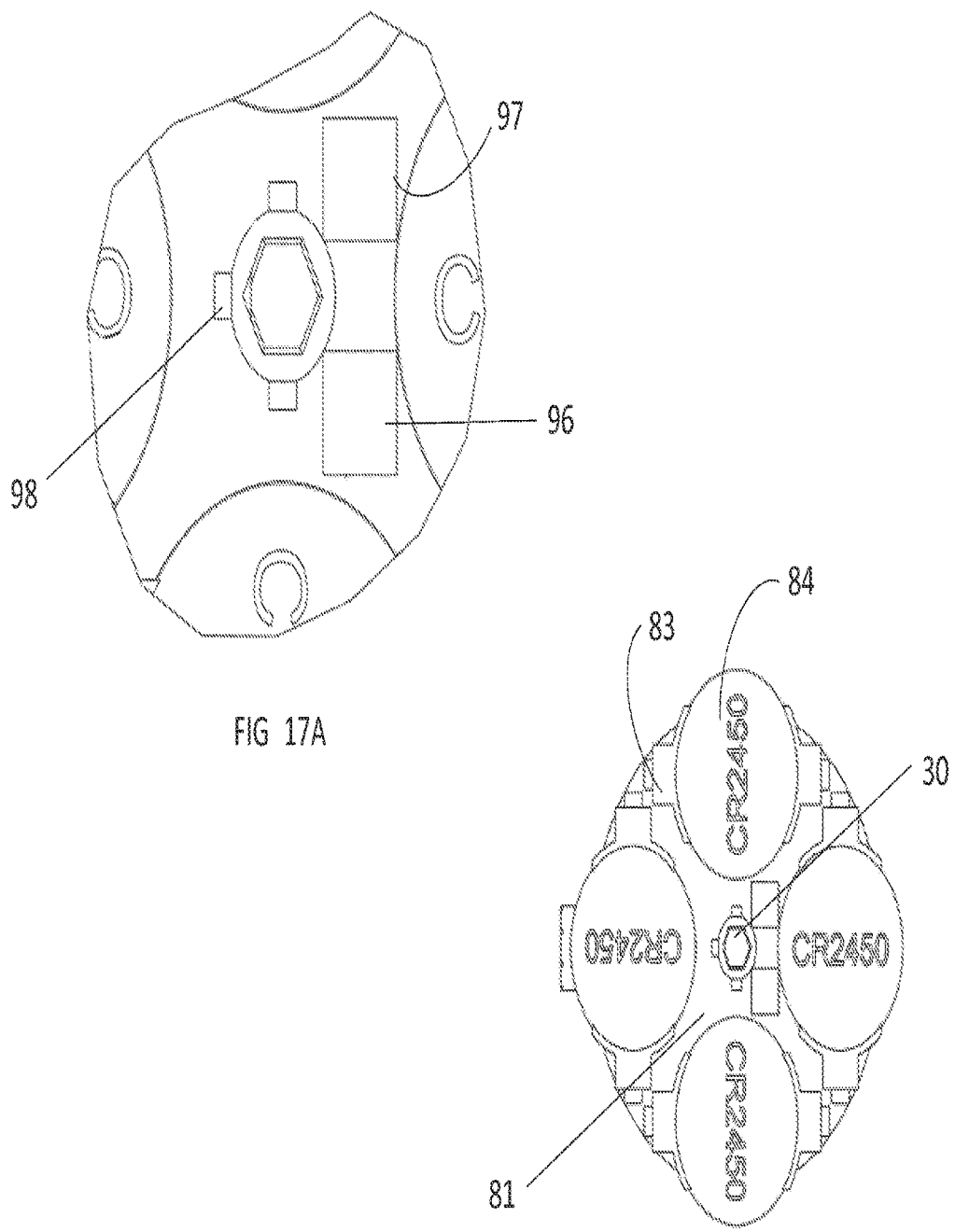

The lock subsystem of a different preferred embodiment of the present invention is shown FIG. 11. In this preferred embodiment, the lock subsystem operates substantially as just described; however, lock gear 50 is not attached directly to rotating shaft 30. Instead, one way bearing 65 (also called a clutch or clutch bearing or anti-reverse bearing) is attached to rotating shaft 30 in the same manner as previously described for lock gear 50. One way bearing 65 includes outer housing 66 and inner housing 67 (also called the bearing shaft). As well known in the art, in one rotational direction (the clutched direction), one way bearing 65 rotates as a single unit (i.e., with outer housing 66 and inner housing 67 rotating together). In the other rotational direction (the freewheel direction), inner housing spins relative to outer housing 66 (i.e., inner housing 67 rotates while outer housing does not). One way bearing 65 is attached to rotating shaft 30 such that rotating shaft 30 rotates with inner housing 67.

Lock gear 50 is fixedly attached to outer housing 66 of one way bearing 65 such that when outer housing 66 rotates, lock gear 50 rotates likewise. In this manner, when lock switch 45 (not shown) engages lock gear 50 in the locked position, outer housing 66 is likewise locked, preventing inner housing 67, and consequently rotating shaft 30, from rotating in the clutched direction, while allowing inner housing 67 to rotate in the freewheel direction regardless of the state of the lock subsystem. In certain preferred embodiments, one way bearing 65 is oriented such that the freewheel direction coincides with the biasing direction of torsion spring 55, which may be the spooling direction (i.e., the winding direction). In this manner, the device will continue to wind, but not to unwind, when the lock subsystem is engaged. In this preferred embodiment, the device thereby eliminates slack in the leash member by constantly winding excess slack regardless of the state of the lock subsystem.

Certain embodiments of the present invention may include electronic features. One such preferred embodiment is shown in FIGS. 12A-C and 13. This embodiment includes electronics module 80, which contains certain electronic circuitry and batteries and is positioned below the torsion spring assembly previously discussed. Such embodiment may include an ultrasonic whistle device for alerting and training animals capable of hearing ultrasonic frequencies, such as dogs. Here, ultrasonic transducer 82 is located in housing 86 of electronics module 80. The transducer is operationally connected to printed circuit board 81, which includes a signal generator/oscillator for creating and sending to ultrasonic transducer 82 ultrasonic signals and which may be manually triggered by a user by means of whistle switch 85. Alternatively, ultrasonic transducer 82 may include an integrated signal generator/oscillator, eliminating the need for such circuitry on a separate printed circuit board. The ultrasonic transducer may be, for example, a Kobitone Audio part number 255-400st10p-rox.

Other embodiments of the present invention may include an active damping/braking system as shown in FIGS. 14-17. In such embodiments, rotating shaft 30 is fixedly attached, either directly or indirectly, with ferromagnetic rotor 94 as has been previously described for other components fixed to the rotating shaft, for example, lock gear 50. In this way, when rotating shaft 30 rotates, so too does ferromagnetic rotor 94, and likewise, when ferromagnetic rotor 94 is prevented from spinning or is slowed, as will be described presently, so too is rotating shaft 30 prevented from spinning or slowed.

Residual magnet 91 is fixed in proximity to ferromagnetic rotor 94 such that residual magnet 91 may exert magnetic force on ferromagnetic rotor 94. Residual magnet 91 has placed about it one or more coils 92. When coils 92 are electrically pulsed, for example, from batteries 84 as controlled by microcontroller 96 on printed circuit board 81, the magnetic flux of horseshoe residual magnet increases. As the magnetic flux of horseshoe residual magnet 91 increases, the drag on ferromagnetic rotor 94 increases, retarding and ultimately stopping (at sufficient magnetic flux) the spinning of ferromagnetic rotor 94, and therefor the spinning of rotating shaft 30. As will be understood by those of skill in the art, residual magnets may be magnetized to various fluxes (or demagnetized to zero flux) by the application of specific electrical pulses to coils on the magnet. The operation of residual magnets is more fully described, for example, in published United Stated patent application 2006/0219497, incorporated herein by reference.

Residual magnet 91 functions as the stator of the brake 90 and may be of shapes other than the horseshoe shape depicted in the figures, for example, it may comprise a cylindrical or flat bar, or arbitrary curvature, among other shapes. It will be understood that coils 92 are electrically insulated from residual magnet 91.

Residual magnet 91 alternatively may be a standard electromagnet, however, residual magnets are preferred because a low current draw is required to continually cycle the states and saturation (flux) of the magnet. Also, residual magnets do not continue to consume electricity after the state is changed on the magnet. This extends battery life significantly. Alternatively, instead of a magnetic brake, a disc and caliper brake, whether or not hydraulically activated, may be used as a braking mechanism.

The active damping/braking system thus described may be manually controlled by a user, for example, by use of a trigger or button. Such button may be dedicated to the damping/braking function or may concurrently trigger other features such as the ultrasonic whistle previously described.

The damping/braking system may also be controlled automatically by control circuitry in accordance with inputs received from one or more sensors. For example, embodiments of the present invention may include one or more of a drop sensor/accelerometer, speed sensor/rotation sensor/counter and other sensors. The accelerometer 97 may sense acceleration in all directions and the microprocessor may process that signal to determine whether or not the device has been dropped and whether or not the device is being dragged by the pet. The device may automatically lock in either of these cases and the whistle may sound to alert the pet to stop. Speed sensor rotation counter 98 may be an inductive type sensor wherein rotating shaft 30 may be magnetized and the inductive sensor may be positioned sufficiently close to rotating shaft 30 so that the fluctuating magnetic field caused by the shaft's rotation induces electric pulses in the sensor, and microcontroller 96 can then count the pulses and the pulse rate to determine the rotational speed of the main shaft and ultimately the wind/unwind speed, leash member extension and acceleration and the like. Alternatively, the sensor could utilize any other suitable rotational sensor such as optical or physical contact switches and the like.

Drop sensor/accelerometer 97 may be configured such that it signals the microcontroller 96 when the unit has been dropped by a user (e.g., through downward gravitational acceleration followed by a high impulse deceleration upon striking the ground). In such circumstances, the microcontroller may active the damping/brake system and/or generate an ultrasonic sound via the ultrasonic transducer. Additionally, the speed sensor/rotation counter may be used to monitor the unwound length of leash member 5 and/or the speed or acceleration of the unwinding of leash member 5. These sensors may signal the control circuitry of circumstances such as, for example, a lunging pet (where unwinding acceleration is high), a running pet (where unwinding speed is high) or a nearly fully extended leash member (based on speed of unwinding and time of unwinding). In each case, the control circuitry may activate the damping/brake system and/or generate an ultrasonic sound via the ultrasonic transducer. For example, when the microcontroller determines that leash member 5 has been unwound a predefined percentage of its total length (e.g., within 2 feet of the end of the leash member length), the microprocessor may begin braking and/or generating an ultrasonic sound to stop and/or signal the pet. Drop sensor/accelerometer 97 may be an LIS3DHTR produced by STMicroelectronics N.V.

In the foregoing examples, the ultrasonic sound may differ in pitch, duration, pattern, volume among other parameters depending on the trigger condition (e.g., dropped unit, sudden acceleration by the pet, pet nearing end of leash length). Additionally, any other sound may be utilized such as clicking, snapping, ringing and the like. In this manner, sounds may be utilized to train pets, as is commonly known by those of skill in the pet/dog training arts.

Also in the foregoing examples, the microcontroller may alter the signals sent to coils 92, thereby adjusting the strength of the magnetic flux and consequently the amount of damping.

Figure 18:
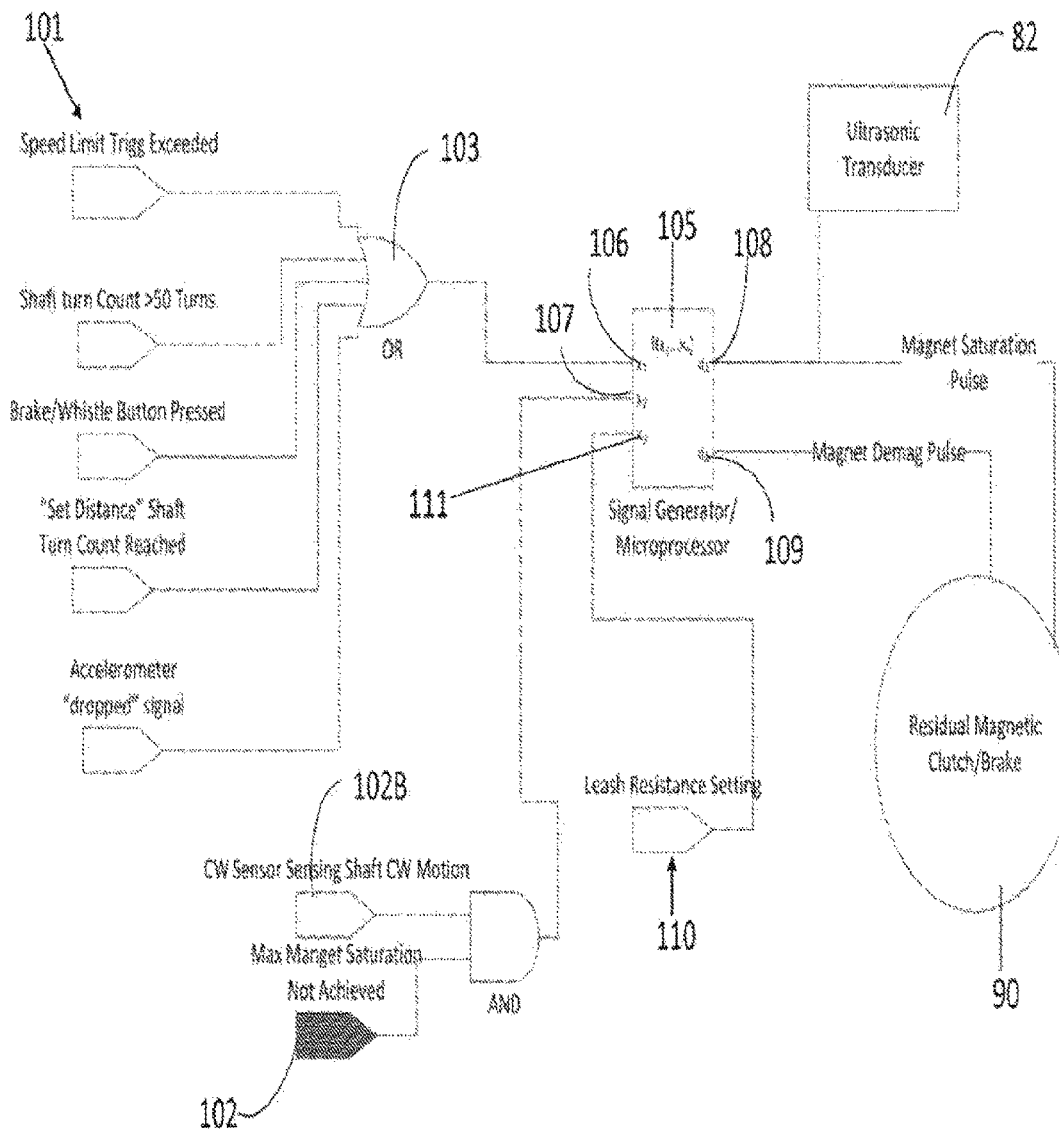
FIG. 18 is a logic diagram for the control circuitry of a preferred embodiment of the present invention.
Figure 19:
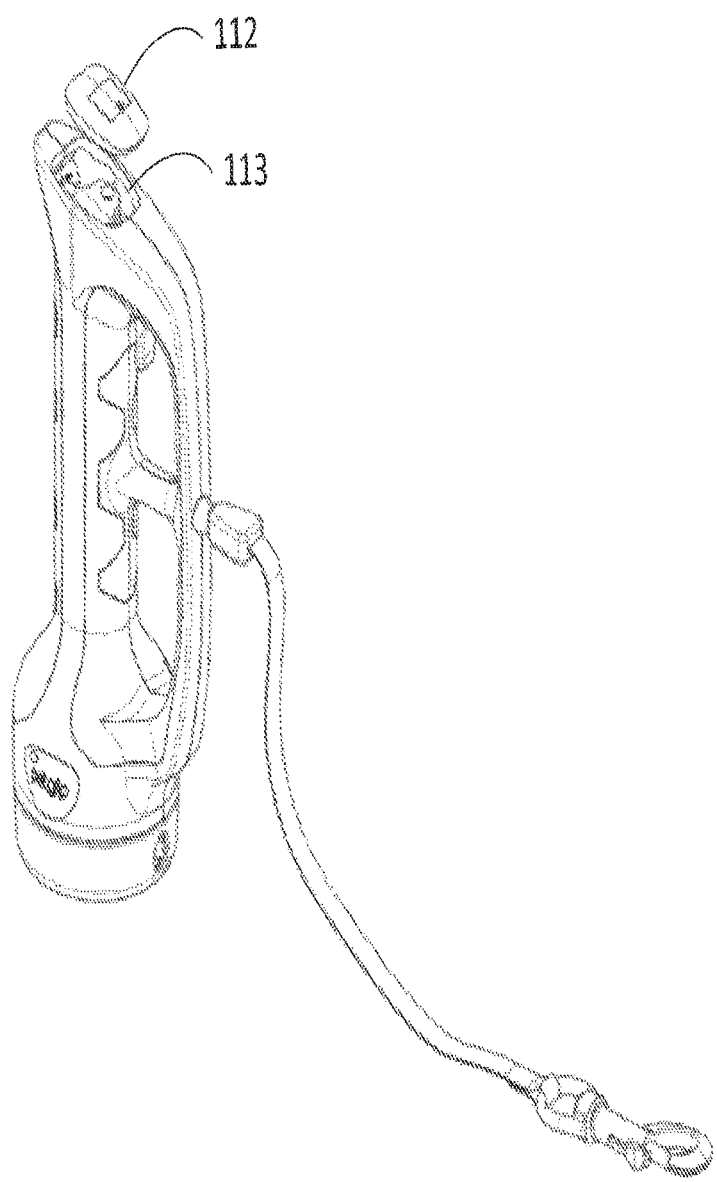
FIG. 19 is a partially exploded view of a preferred embodiment of the present invention.

FIG. 18 depicts a logic diagram for the control circuitry of a preferred embodiment of the present invention as previously discussed, except that it will be understood that ultrasonic transducer 82 and brake 90, as described in detail above, are not part of the control circuitry but instead may be controlled by it. The control circuitry may be contained in microcontroller 96, as discrete circuitry, or as any combination of electrical and electronic components that achieve the desired logic. It will be understood that the various logic elements and logic circuit depicted in FIG. 18 may be combined into a single microcontroller chip or be split into any number of discrete circuits and/or integrated and/or surface mounted components without departing from the inventive aspects of the present invention. Likewise, the logic elements depicted in FIG. 18 may be implemented in firmware and/or software within a microcontroller.

Trigger inputs 101 may include triggers based on leash speed/acceleration, device accelerometer/drop detector, shaft turns, and user inputs such as brake and whistle button presses, among others. The outputs of these trigger inputs 101 are logically OR'ed in OR gate 103 so that if any of the trigger inputs 101 are triggered (i.e., the signal on them goes "high" or "1"), then the output of the OR gate 103 is also triggered. The output OR gate 103 is sent to logic circuit trigger input 106 for processing by logic circuit 105.

Gate inputs 102 may include a shaft rotation sensor input and residual magnet saturation detector. The residual magnet saturation detector output may be inverted so that this signal is on (i.e., "high" or "1") when the brake 90 is not magnetically saturated (i.e., in a state of maximum magnetic flux). The output of gate inputs 102 are logically AND'ed in AND gate 104 so that the output of AND gate 104 is on only when both gate inputs are on. The output of AND gate 104 is fed to logic circuit gate input 107 for processing by logic circuit 105.

Logic circuit 105 may process the inputs 106 and 107 as follows. Upon receiving any one of the five input signals 101 to apply the brake/whistle protocol, the microprocessor 105 may initially apply a starting fractional braking, for example 10% of the full braking capacity to the magnet. If speed sensor 102B senses that the shaft is continuing to turn in the direction of unwinding, after one complete revolution the control system may increase the amount of saturation in the magnet, thereby increasing the braking effect by, for example, another 10%. This process may continue until the saturation of the magnet is at 100% (meaning that the brake is fully applied). By operating in the foregoing manner, the device may function effectively for all size dogs regardless of their weight. For example, a small dog may typically be stopped fairly quickly without producing a shock load on the user's hand and/or arm due to the dog's light weight and resulting small momentum. By contrast, a large dog would generate a significant shock load if stopped quickly due to the dog's greater weight and resulting large momentum. Therefore, a large dog may be gradually slowed down and the shock load that would otherwise be experienced may be prevented, that is, preferred embodiments of the present invention may allow up to several feet of the leash to be unwound during the process of gradually braking (i.e., slowing) a heavy a pet, thereby dramatically reducing the force required to slow the pet and protecting both the pet and the owner from the typical shock loads.

Also in preferred embodiments of the present invention, leash resistance input 110 may feed a leash resistance signal to logic circuit leash resistance input 111, in response to which logic circuit 105 may set a base-level resistance for brake 90. In this manner, a user may set the leash for a higher or lower default wind/unwind resistance if desired. For example, for untrained pets or for heavier pets, it may be desirable to increase the unwinding resistance when the leash is unwinding. This additional resistance will cause the pet to not move as quickly relative to the leash since there is more continual drag applied to the spool while unwinding.

Logic circuit 105 may be any programmable or fixed circuit capable of providing the foregoing input/output logic, including, for example, an Attiny 13A 8 bit AVR 8126 Mirocontroller with 1 kbyte in system programmable flash produced by Atmel Corporation.

In all the foregoing preferred embodiments, the device may be comprise in part an integrated pedometer 112 which may be fitted into housing 10 in pedometer cutout 113. Pedometer 112 may also or alternatively include a digital readout of any parameter monitored or maintained by the device, including for example, current/average/maximum leash member wind/unwind speed and/or acceleration, trip distance, total distance, elevation, compass heading, GPS coordinates, geofencing, stopwatch and timer functionality, severe weather alert broadcasting and the like.

Figure 20:
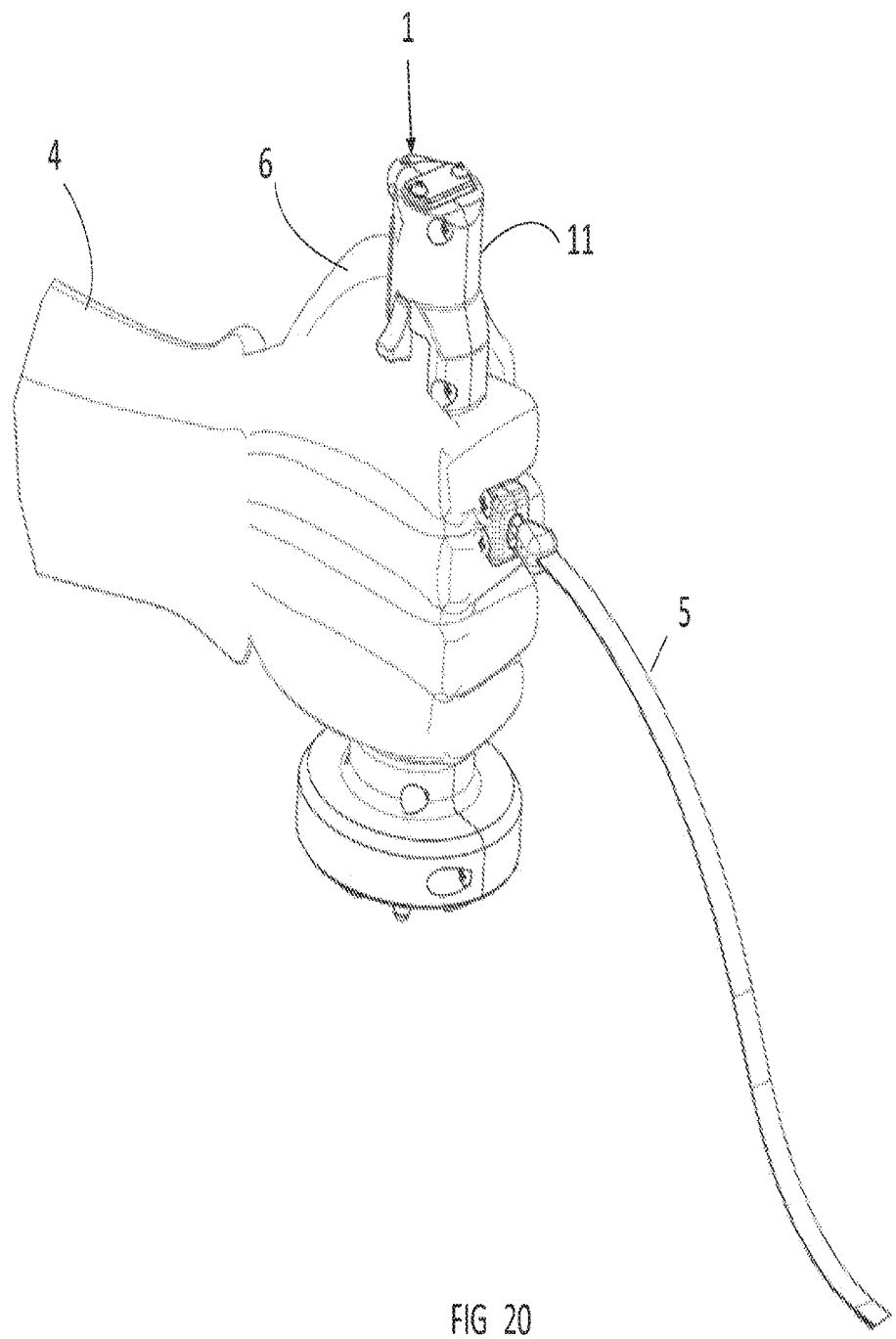
FIGS. 20 and 21 are perspective views of an alternative, "baton" embodiment of the present invention in use in a user's hand.
Figure 21:
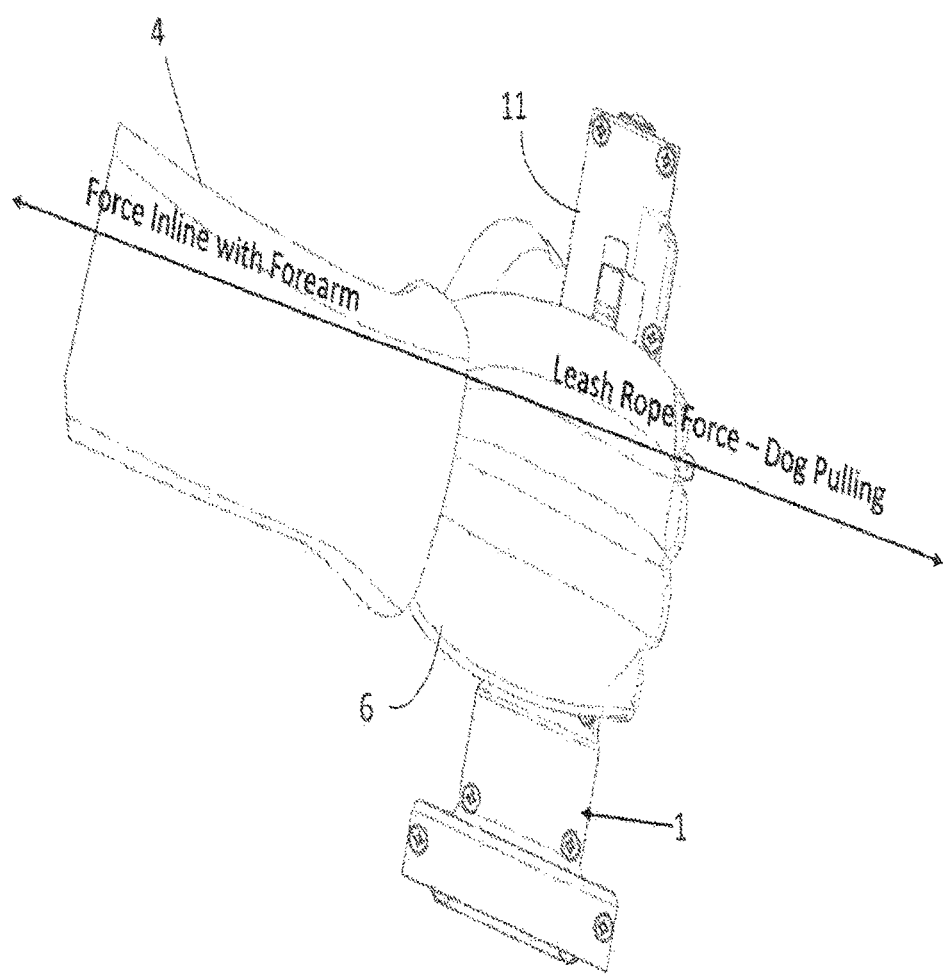
Figure 22:
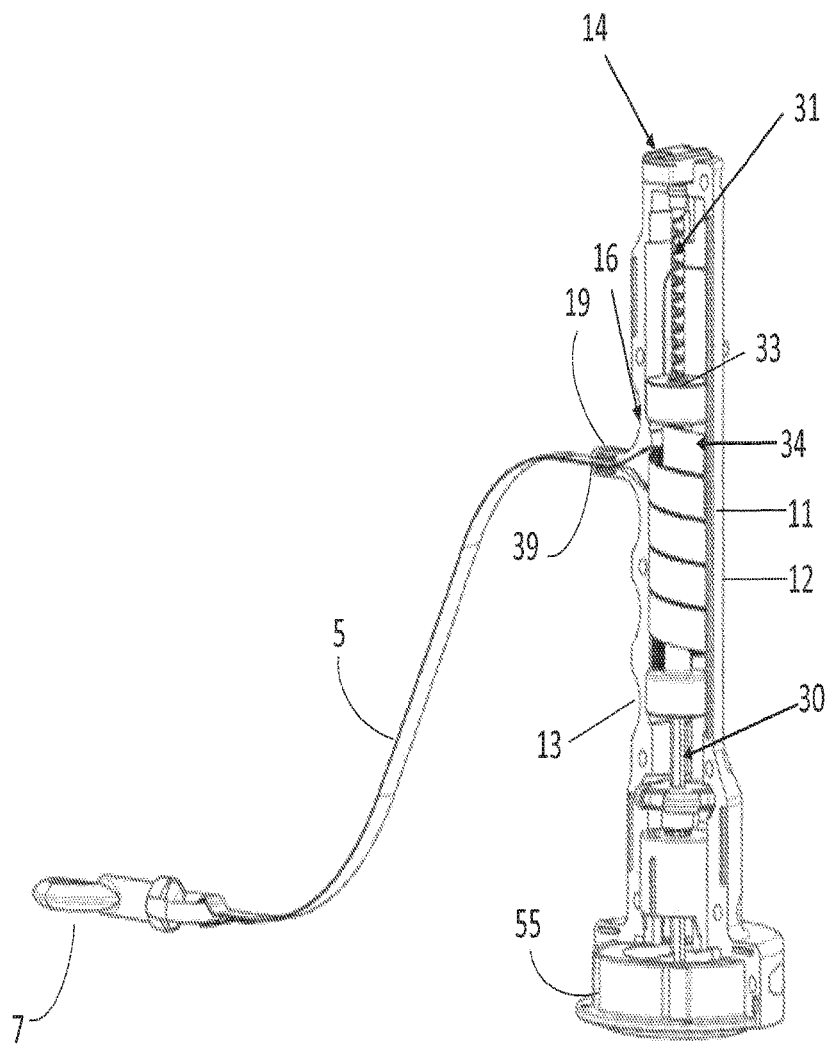
FIG. 22 is a cutaway view of the alternative embodiment of FIGS. 20 and 21.

In all preferred embodiments, the unit may be weighted such that weight distribution is such that the unit does not tend to rotate or otherwise create a moment about a users wrist when held by a user. In this manner, the device may be used while running or in other active pursuits while feeling to the user much like runner's baton. The alternative embodiment depicted in FIGS. 20-22 depict a simplified embodiment of the present invention more closely resembling a runner's baton than does the embodiment depicted in the previously discussed embodiment. FIGS. 20-22 include callouts corresponding to those of FIGS. 1-19, previously discussed.

Embodiments of the present invention may also include weighted elements to increase a user's exercise for example when using the device while jogging. Weighted elements may be incorporated, for example, in end cap 87. Weighted elements of differing weights, changeable for example by screwing or snapping end cap 87 into housing 10, may be provided.

Although the particular embodiments shown and described above will prove to be useful in many applications in the art to which the present invention pertains, further modifications of the present invention will occur to persons skilled in the art. All such modifications are deemed to be within the scope and spirit of the present invention as defined by the appended claims.

What is claimed is:

1. A retractable leash comprising
a housing having an interior and forming a handle, the handle having a top and a bottom;
a spool located in the interior of the housing, the spool located on a shaft, the shaft also located in the interior of the housing;
a finger separator positioned away from the handle top and handle bottom and extending outwardly from the handle, the finger separator having an aperture at a distal end and an internal channel, the internal channel providing communication between the aperture and the interior of the housing; and
a leash member affixed to the spool and extending through the internal channel of the finger separator and through the aperture of the finger separator;
wherein the spool oscillates continuously up and down the shaft as the leash member is unwound from the spool.

2. The retractable leash of claim 1 wherein, when operated by a user with the leash member extended at least in part, the leash member lies substantially co-axially with the user's forearm.

3. The retractable leash of claim 1 wherein, when operated by a user, the finger separator lies between the user's fingers.

4. The retractable leash of claim 1 wherein, when operated by a user with the leash member extended at least in part, the leash member lies substantially co-axially with the user's forearm and the finger separator lies between the user's fingers.

5. The retractable leash of claim 1 wherein the handle is substantially cylindrical.

6. The retractable leash of claim 1 further comprising
a lock coupled to the spool, the lock having a locked position in which rotation of the spool is prevented in at least one direction;
a spool bushing on the spool;
an interior load bearing surface in the interior of the housing opposite the spool bushing; and
a gap between the spool bushing and the interior load bearing surface when the leash member is not under load; wherein
the shaft deforms when the lock is in the locked position and the leash member is under load such that the spool bushing comes in contact with the interior load bearing surface.

7. The retractable leash of claim 6 wherein, when operated by a user with the leash member extended at least in part, the leash member lies substantially co-axially with a user's forearm.

8. The retractable leash of claim 6 wherein, when operated by a user, the finger separator lies between the user's fingers.

9. The retractable leash of claim 6 wherein, when operated by a user with the leash member extended at least in part, the leash member lies substantially co-axially with the user's forearm and the finger separator lies between the user's fingers.

10. The retractable leash of claim 6 wherein the handle is substantially cylindrical.

11. The retractable leash of claim 1 wherein
the shaft comprises a fixed shaft portion and a rotating shaft portion;
upon rotation of the rotating shaft portion in a first direction, the leash member is wound onto the spool;
upon rotation of the rotating shaft portion in a second direction, the leash member is unwound off of the spool; and
upon rotation of the rotating shaft portion, the spool translates axially along the shaft and rotates with the shaft.

12. The retractable leash of claim 11 wherein, when operated by a user with the leash member extended at least in part, the leash member lies substantially co-axially with the user's forearm and the finger separator lies between the user's fingers.

13. The retractable leash of claim 11 further comprising a torsion spring coupled to the rotating shaft portion, the torsion spring being biased to turn the rotating shaft portion in the first direction.

14. The retractable leash of claim 13 further comprising
a lock coupled to the rotating shaft portion, the lock having a locked position in which rotation of the rotating shaft portion in the second direction is prevented; and
a one-way bearing coupled to the rotating shaft portion and the lock, the one-way bearing permitting rotation of the rotating shaft portion in the first direction when the lock is in the locked position.

15. The retractable leash of claim 14 wherein, when operated by a user with the leash member extended at least in part, the leash member lies substantially co-axially with the user's forearm and the finger separator lies between the user's fingers.

16. The retractable leash of claim 13 further comprising a damping mechanism, the damping mechanism comprising
a ferromagnetic rotor coupled to the rotating shaft portion; and
a residual magnet operatively coupled the ferromagnetic rotor;
wherein when the residual magnet is magnetized, the ferromagnetic rotor dampens the rotation of the rotating shaft portion in the second direction.

17. The retractable leash of claim 16 further comprising control circuitry operatively coupled to the residual magnet for controlling magnetization of the residual motor.

18. The retractable leash of claim 17 wherein the control circuitry further comprises at least one sensor input selected from the group of sensor inputs consisting of leash speed inputs, leash acceleration inputs, device accelerometer inputs, device drop detector inputs, shaft turn inputs, and user control inputs, wherein the control circuitry controls the magnetization of the residual motor based on the at least one sensor input.

19. The retractable leash of claim 17 further comprising an ultrasonic transducer operatively connected to the control circuitry, wherein the control circuitry controls the ultrasonic transducer to produce ultrasonic sounds.

20. The retractable leash of claim 19 wherein the control circuitry further comprises at least one sensor input selected from the group of sensor inputs consisting of leash speed inputs, leash acceleration inputs, device accelerometer inputs, device drop detector inputs, shaft turn inputs, and user control inputs, wherein the control circuitry controls the ultrasonic transducer and the magnetization of the residual motor based on the at least one sensor input.

* * * * *